(12) United States Patent

Steinmann

(10) Patent No.: US 9,683,755 B2
(45) Date of Patent: Jun. 20, 2017

(54) SUPPORT TRAY FOR AIR CONDITIONER CLEANING

(71) Applicant: Jacob F. Steinmann, Ridgefield, CT (US)

(72) Inventor: Jacob F. Steinmann, Ridgefield, CT (US)

(73) Assignee: CoilPod LLC, Yorktown Heights, NY (US)

( * ) Notice: Subject to any disclaimer, the term of this patent is extended or adjusted under 35 U.S.C. 154(b) by 1 day.

(21) Appl. No.: 14/121,696

(22) Filed: Oct. 8, 2014

(65) Prior Publication Data

US 2016/0102886 A1  Apr. 14, 2016

(51) Int. Cl.
*F16M 11/22* (2006.01)
*F24F 13/32* (2006.01)

(52) U.S. Cl.
CPC ............ *F24F 13/32* (2013.01); *F16M 11/22* (2013.01); *F24F 2221/22* (2013.01)

(58) Field of Classification Search
CPC ....... F24F 13/32; F24F 2221/22; F16M 11/22
USPC ............. 248/678, 581, 27.5; D7/553.4, 555; D32/35, 56
See application file for complete search history.

(56) References Cited

U.S. PATENT DOCUMENTS

| | | | | |
|---|---|---|---|---|
| 2,789,873 A | * | 4/1957 | Gonder | A47F 5/13 211/133.4 |
| 4,229,858 A | * | 10/1980 | Baxter | A22C 25/06 114/364 |
| D268,728 S | * | 4/1983 | Poling | D3/313 |
| D288,374 S | * | 2/1987 | Ikeda | D32/56 |
| 4,783,971 A | * | 11/1988 | Alba | F25D 21/14 248/225.11 |
| D316,168 S | * | 4/1991 | Miller | D32/25 |
| 5,454,538 A | * | 10/1995 | Merideth | F28F 9/007 248/148 |
| 5,769,376 A | * | 6/1998 | Bostic | B65D 85/66 108/55.1 |
| 6,182,677 B1 | * | 2/2001 | Pignataro | B08B 9/0321 134/166 C |
| D446,370 S | * | 8/2001 | Avila Adikimenakis | D32/56 |
| 7,950,620 B2 | * | 5/2011 | Knight | F24F 1/60 248/143 |
| 9,074,812 B2 | * | 7/2015 | Rowland | 3/222 |
| 2012/0152797 A1 | * | 6/2012 | Gross | B65D 81/261 206/557 |
| 2013/0160800 A1 | * | 6/2013 | Steinmann | B08B 5/02 134/21 |

OTHER PUBLICATIONS

Lodging Magazine, Nov. 2013, Inside Front Cover: Ad for Cintas' Chemtron Cleaning Process or HVAC Units.

* cited by examiner

*Primary Examiner* — Muhammad Ijaz
(74) *Attorney, Agent, or Firm* — Richard P. Fennelly

(57) ABSTRACT

The present invention is a support tray for use in the cleaning of an air conditioner unit that has a floor portion with a raised, generally centrally disposed support member, with a sloped upper surface, for supporting the air conditioner unit.

2 Claims, 2 Drawing Sheets

SUPPORT TRAY FOR AIR CONDITIONER CLEANING

CROSS-REFERENCE TO RELATED APPLICATIONS

This application claims the benefit of U.S. Provisional Patent Application Ser. No. 61/961,259, filed Oct. 10, 2013.

BACKGROUND OF THE INVENTION

The present invention relates to an improved support tray for use, for example, in the cleaning of wall-mounted air conditioner units, particularly for use in the cleaning of the well-known packaged terminal air conditioners (hereinafter termed "PTAC") that are commonly installed in hospitality settings. It also relates to the use of a dust containment bag during the cleaning of such air conditioner units, while the unit is sitting on the support tray of this invention.

BRIEF SUMMARY OF THE INVENTION

One common way for PTAC units, for example, to be cleaned involves removing them from their wall mounting in the room, placing the removed unit on a flat tray with sidewalls that is often placed on a tarp in the room, and then commencing the cleaning operation that often comprises using a spray of cleaning solution. The flat tray collects the runoff from this operation protecting the adjacent areas of the room from undesired contamination. However, it has been found that placement of the unit of the flat tray can make it difficult for the technician or technicians to get their fingers and hands under the air conditioning unit to first lower the unit into the tray and then to lift it back into its wall unit after the cleaning operation has been completed.

One aspect of the present invention relates to an improved support tray that is intended to facilitate the aforementioned cleaning operation.

DETAILED DESCRIPTION OF THE INVENTION

Figure 1:
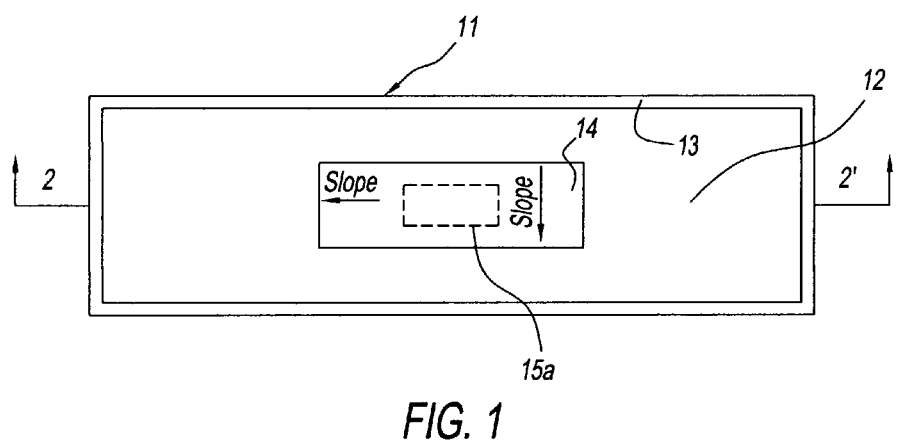
FIG. 1 is an overhead view showing the support tray 11 of the present invention.

FIG. 1 is an overhead view showing the support tray 11 of the present invention. It comprises a substantially flat floor portion 12 with peripheral sidewalk 13 analogous to the conventional tray but it also comprises a generally centrally disposed raised support member 14 which has a length and width sufficient to support an air conditioner unit that might be placed upon it for cleaning.

Figure 2:
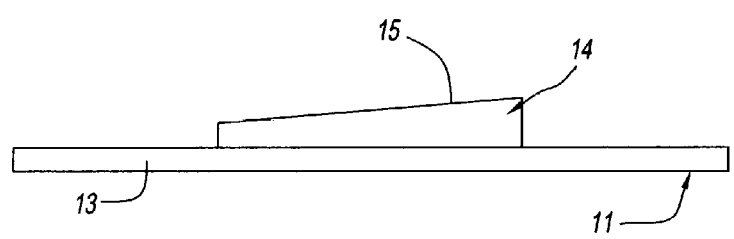
FIG. 2 is a cross-sectional view of the tray 11 taken along lines 2-2' of FIG. 1.

FIG. 2 is a cross-sectional view of the tray 11 taken along lines 2 2' of FIG. 1 which additionally shows that the upper surface 15 of raised support member 14 upon which the unit to be clean rests is optionally, but preferably, sloped a sufficient degree in relationship to the floor portion of the tray (perhaps up to about 10 percent or so from the horizontal) to enhance drainage of any spray solvents that might be used towards the drain hole that is contained in most of these air conditioner units. While Fig. shows sloping of the upper surface in one direction, it is best to have the tray surface sloped in two directions as shown by dashed arrows in the view of FIG. 1 so as to promote drainage towards the drain hole which is normally placed near one corner of the unit to be cleaned.

Figure 3:
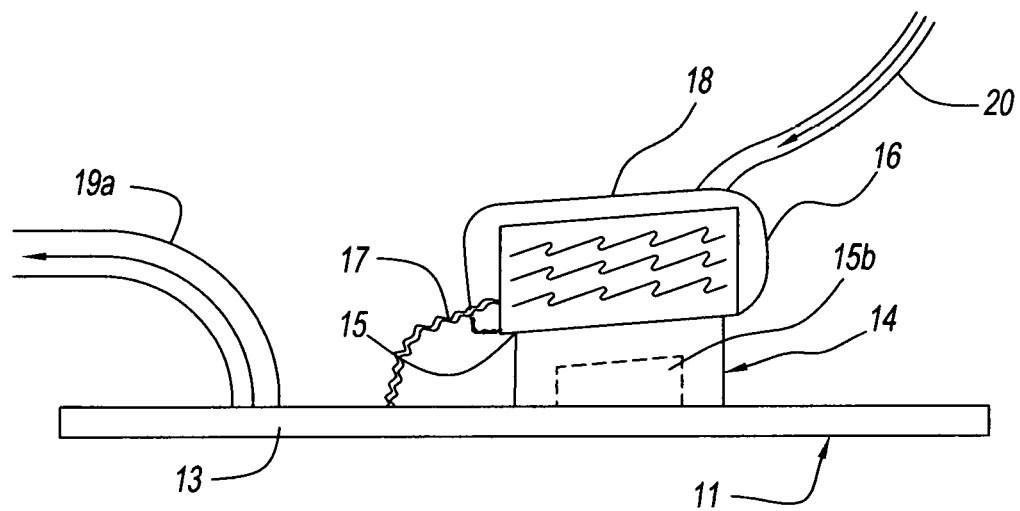
FIG. 3 is a cross-sectional view showing the invention in operation during the cleaning of an air conditioner unit.

FIG. 3 is a cross-sectional view showing the invention in operation during the cleaning of an air conditioner unit 16, optionally with a containment bag 18 being used to contain any excess solvent spray, if solvent is used in the cleaning operation, or dislodged airborne debris from the unit, if a combination of exhaust air and vacuum air from a wet/dry vacuum is used in a manner analogous to that described in U.S. Published Patent Application No. 2013/0160800 for the cleaning of a self-contained condenser coil subassembly in a variety of plug-in cooling appliances. If solvent is used to clean the air conditioner unit shown in FIG. 3, it can be supplied through the surface of bag 18 through a suitable access opening via hose 20 or by means of a wand from any conventional sprayer apparatus, optionally with any excess runoff 17 being vacuumed from the tray 11 by vacuum hose 19a. If the cleaning is carried out by a combination of exhaust air and vacuum from a wet/dry vacuum, as shown in the aforementioned Published Patent Application, hose 19a would also be inserted through one or more access hole(s) 19 in the surface of bag 16 to remove airborne debris contained inside the bag by exhaust air from hose 20, in a manner analogous to that described in the aforementioned Published Patent Application. It is preferred in accordance with this invention that the width of the air conditioner that is to be cleaned slightly exceed in length the length of the support member 14 so one or more persons raising or lowering the air conditioner before and after the cleaning operation have unrestricted finger access to lower and lift the appliance. This is not provided with conventional flat trays not having a raised support as shown herein.

Figure 4:
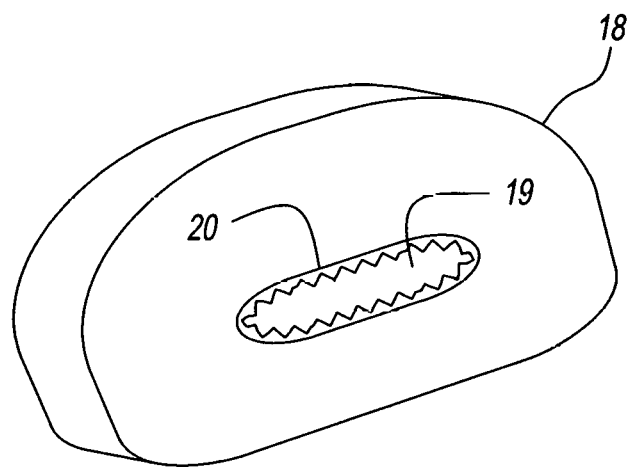
FIG. 4 shows a novel containment bag.

FIG. 4 shows a novel containment bag 18 from that shown in the aforementioned Published Patent Application which preferably had two access holes. This new design has a single elongated slit 19 with an inwardly facing peripheral member 20 (formed of neoprene, plastic whiskers, or the like) to assist in sealing the opening against the surfaces of any hose inserted to supply a cleaning agent (or vacuum air) into the interior of the bag during the cleaning operation.

An optional feature of the present invention is to create appropriate hollow portions in the raised support member 14 to accommodate a suitably sized jacking mechanism to lower and then raise the air conditioner from and to the sleeve that is permanently affixed to the walls of the room containing it. FIGS. 1 and 3, respectively, show by way of dotted lines the top opening 15a and side opening 15b when such an open structure is created. The solid portions of the support member 14 immediately adjacent these openings are wide enough and strong enough to not compromise the support function for the air conditioner that is to be supported.

What is claimed:

1. A support tray for use in a cleaning of a packaged terminal air conditioner unit, said tray comprising:
   a floor portion comprising a plurality of peripheral sidewalls;
   said floor portion further comprising:
   a single, generally centrally disposed raised support member
   extending upward from said floor portion and above said peripheral sidewalls, having a length, a width and a substantially rectangular flat upper surface to support said packaged terminal air conditioner unit for the cleaning;

said single, generally centrally disposed raised support member comprising
  a substantially wedge-shaped cross-section; and
  a plurality of corners each of said corner positioned at a respective height, wherein said substantially rectangular flat upper surface is sloped with respect to the floor portion in a first direction and a second direction such that the height of one of the plurality of corner is lower than the respective heights of all other corners of the plurality of corners of said single, generally centrally disposed raised support member.

2. The support tray as claimed in claim 1 wherein the floor portion is substantially flat.

* * * * *